(12) United States Patent
Guenster et al.

(10) Patent No.: US 9,533,452 B2
(45) Date of Patent: Jan. 3, 2017

(54) METHOD FOR STABILIZING A POWDER BED BY MEANS OF VACUUM FOR ADDITIVE MANUFACTURING

(71) Applicant: Bundesrepublik Deutschland, vertreten durch das Bundesministerium fuer Wirtschaft und Technologie, dieses vertreten durch den Praesidenten der BAM, Bundesanstalt fuer Materialforschung und—pruefung, Berlin (DE)

(72) Inventors: Jens Guenster, Berlin (DE); Andrea Zocca, Berlin (DE); Cynthia Morais Gomes, Berlin (DE); Thomas Muehler, Clausthal-Zellerfeld (DE)

(73) Assignee: Bundesrepublik Deutschland, vertreten durch das Bundesministerium fuer Wirtschaft und Technologie, dieses vertreten durch den Praesidenten der BAM, Bundesanstalt fuer Materialforschung und-pruefung, Berlin (DE)

(*) Notice: Subject to any disclaimer, the term of this patent is extended or adjusted under 35 U.S.C. 154(b) by 0 days.

(21) Appl. No.: 14/431,688

(22) PCT Filed: Sep. 27, 2013

(86) PCT No.: PCT/EP2013/070289
§ 371 (c)(1),
(2) Date: Mar. 26, 2015

(87) PCT Pub. No.: WO2014/049159
PCT Pub. Date: Apr. 3, 2014

(65) Prior Publication Data
US 2015/0246485 A1    Sep. 3, 2015

(30) Foreign Application Priority Data

Sep. 28, 2012  (DE) .................. 10 2012 109 262

(51) Int. Cl.
*B29C 67/00* (2006.01)
*B22F 3/105* (2006.01)
(Continued)

(52) U.S. Cl.
CPC ......... *B29C 67/0077* (2013.01); *B22F 3/1055* (2013.01); *B29C 67/0081* (2013.01);
(Continued)

(58) Field of Classification Search
CPC ............ B29B 67/0077; B29B 67/0081; B29B 67/0085; B28B 1/001; B22F 3/1055; B22F 2003/1056
See application file for complete search history.

(56) References Cited

U.S. PATENT DOCUMENTS

| | | |
|---|---|---|
| 5,017,753 A | 5/1991 | Deckard |
| 2002/0079601 A1 | 6/2002 | Russell et al. |

FOREIGN PATENT DOCUMENTS

| | | |
|---|---|---|
| DE | 199 52 998 | 5/2001 |
| JP | 2004-175093 | 6/2004 |

(Continued)

OTHER PUBLICATIONS

Jensen, K: State-of-the-Art of Different Available and Coming Rp-Systems. Proceedings of the "2nd Scandinavian Rapid Prototyping Conference, Exhibition and Course", Aarhus, 1993 (29 pgs.).
(Continued)

*Primary Examiner* — Mary F Theisen
(74) *Attorney, Agent, or Firm* — Dicke, Billig & Czaja, PLLC

(57) ABSTRACT

The invention relates to a device and a method for stabilizing a powder bed by means of low pressure for an additive
(Continued)

manufacturing method, wherein the device comprises: a container open at least on one side, comprising a bottom, at least one side wall and a container opening; a filter in or above the bottom and/or in the at least one side wall, wherein an area occupied by the filter corresponds to the area of the bottom or the area of the side wall and wherein the filter is substantially impermeable to a powder comprising the powder bed; and a connection at the bottom and/or at the side wall of the container or on a side of the filter facing away from the container opening, wherein the connection is suitable for connection to a suction pump, such that a powder bed arranged in the container is pressed against the filter and stabilized by means of a vacuum produced by the suction pump.

22 Claims, 1 Drawing Sheet

(51) Int. Cl.
    *B28B 1/00*     (2006.01)
    *B33Y 10/00*     (2015.01)
    *B33Y 30/00*     (2015.01)
    *B29L 9/00*     (2006.01)

(52) U.S. Cl.
    CPC ...... *B29C 67/0085* (2013.01); *B29C 67/0092* (2013.01); *B22F 2003/1056* (2013.01); *B29L 2009/00* (2013.01); *B33Y 10/00* (2014.12); *B33Y 30/00* (2014.12); *Y02P 10/295* (2015.11)

(56) References Cited

FOREIGN PATENT DOCUMENTS

| WO | 8802677 A2 | 4/1988 |
|----|------------|--------|
| WO | 9206763 A1 | 4/1992 |
| WO | 03016067 A2 | 2/2003 |

OTHER PUBLICATIONS

Sheng, X, Tucholke, U: On Triangulating Surface Models for SLA. Proceedings of the 2nd International Conference on Rapid Prototyping, Dayton, Ohio, Jun. 23-26, 1991 (pp. 232-235).

Lakshminarayan, U, Zong G, Richards W, Marcus, H: Solid Freeform Fabrication of Ceramics. Proceedings of the Symposium on Synthesis and Processing of Ceramics, Fall Meeting of the Material Research Society, Boston, Mass, Dec. 2-6, 1991 (pp. 323-329).

Reinhold Melcher, Dissertation: Rapid prototyping of ceramics by 3D printing. Erlangen, Jan. 27, 2009 (150 pgs.) (English abstract p. 130).

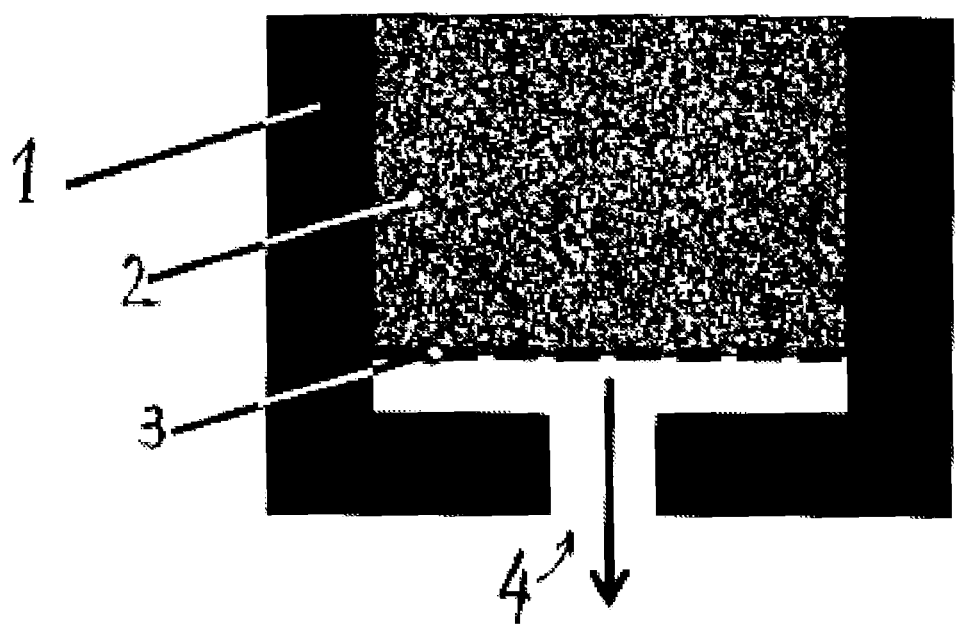

METHOD FOR STABILIZING A POWDER BED BY MEANS OF VACUUM FOR ADDITIVE MANUFACTURING

CROSS REFERENCE TO RELATED APPLICATION

This Utility Patent Application claims priority under 35 U.S.C. §371 to International Application Serial No. PCT/EP2013/070289, filed Sep. 27, 2013, which claims the benefit of German Patent Application No. 10 2012 109 262.1, filed

BACKGROUND

The invention relates to the field of additive manufacturing methods and prototyping or rapid prototyping.

Methods for additive manufacturing differ from subtractive methods such as milling, drilling and erosion in that material is combined into a component. To this end, the material has to be in a state in which it does not in itself define a shape, but rather can be brought into a shape. Starting materials such as workable masses, pastes, powders, liquids etc. meet this requirement. While it is intuitively understood that workable masses and pastes can be shaped into a structure, with powders and liquids this is not directly the case. Normally, the particles of a powder are linked together using an auxiliary substance, for example a binder. Fluids, such as flowable particle suspensions, for example, can be formed into a structure by drying or by a phase transition from liquid to solid. One class of earlier methods for additive manufacturing is constituted by powder-based methods, in which particles of powder are built up in layers, typically 50 to 200 μm thick, and are connected together in each of these layers by the local application of a binder or by local melting with a laser beam. The binder-based powder methods were developed at the Massachusetts Institute of Technology in Cambridge, USA, and the laser-based methods were developed at the University of Texas in Austin, USA in the early 1980s/early 1990s and are known as 3 D printing or selective laser sintering. Both methods are now well established among the (now many) additive manufacturing methods, and with regard to the number of manufactured components, they clearly count among the leading current methods. In addition to a continual optimization of the technologies underlying these two methods, in the 30 years since their invention, there have substantially been no further developments in 3 D printing or selective laser sintering.

In additive manufacturing methods, which are based on building up powdered starting material layer-by-layer, stabilization of the structures (components) embedded in the powder bed is problematic. A fundamental problem in powder-based methods is and always has been the fact that the powder bed, i.e. all of the powdered material which is piled up when building up the layers but which has not been bound into the component, does not support the embedded structure (component) sufficiently during the construction process. When applying a new layer of powder, the already consolidated structure in the powder bed can be displaced, which results in defects in the structure or even in complete loss of structure. For this reason, in powder-based manufacturing technologies, in addition to the component to be manufactured using the appropriate manufacturing technology, additional so-called support structures are also constructed. These support structures anchor the component to be constructed with the working platform and thus fix it into the coordinate system of the building-up chamber of the facility.

Furthermore, support structures are needed when particularly complex geometries are to be produced. Removing the support structures after the actual additive manufacturing process requires an additional process step which is time-consuming and does not lend itself to automation, and thus runs counter to the remit of autonomous manufacturing which can be carried out by additive manufacturing. Thus, there is a need for stabilizing the powder bed in a manner such that support structures can be completely dispensed with, which does not affect the manufacturing process itself and, more importantly, which does not hinder removal of the component from the powder bed. A powder bed with aggregated particles would, for example, hinder ready removal of the component from the powder bed. In particular, removal of the powder which did not belong to the component at locations on the component which were difficult to access would be problematic. The final point is also highly problematic when removing the support structures and constitutes distinct constraints when designing components for powder-based additive manufacturing.

After the building-up process, the support structure has to be separated from the actual component. This process is time-consuming and very difficult to automate.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates one embodiment of a device and method for stabilizing a powder bed.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

For these and other reasons there is a need for the present invention.

These above stated problems can be substantially overcome with the aid of the technology described below. A low pressure is applied to the powder bed by using a vacuum pump and a porous platform on which the layers of powder are piled up for the building-up process. Applying a low pressure means that a pressure drop is produced in the powder bed and air or specially supplied process gases can be sucked through the inherently porous powder bed. The flow of gas produced thereby exerts an additional force on each individual powder particle which acts in the direction of flow of the gas, i.e. in the direction of the building-up platform. In this manner, the individual particles are fixed and the powder bed is stabilized. Since the system including the building-up platform and the powder bed is porous, the pressure gradient degrades quickly as soon as the low pressure is no longer maintained, i.e. the vacuum pump is stopped, for example. In this manner, the flow of gas can be switched off and an influence on the printing process when applying the binder, or the heating process during the selective sintering process, is avoided. The flow of gas is then switched on at the moment at which stabilization of the powder bed is most required, namely upon application of a further layer of powder. The forces which arise during application constitute the biggest risk, namely that of displacing the component undergoing the building-up process within the powder bed and thus of distorting its contours.

It is surprising how uniformly the flow of air is distributed in the powder bed. For this reason, perturbations in the flow of air in the powder bed due to the generation of thick components such as, for example, during selective laser melting of metallic powders, is not necessarily problematic having regard to the stabilizing effect of the flow of gas intended by the invention. The flow of air simply flows around the component. The small channels between the powder particles in fact substantially encourage a laminar flow, i.e. a flow without turbulence in the gas, and can distribute the flow evenly into the channels which surround the thick component. In this regard, the porous powder bed presents sufficient open pores (porosity) in all three directions in space.

In this regard, a device for stabilizing a powder bed in accordance with the present claim 1, a method for layer-by-layer shaping of a component from a material including a powder in accordance with claim 16, a method for additive manufacturing of a component by layer-by-layer consolidation of a powdered material in a powder bed in accordance with claim 23 and a use of a device in accordance with claim 24 are proposed.

In accordance with a first embodiment, a device for stabilizing a powder bed employing low pressure for an additive manufacturing method is proposed, including:—a container which is open on at least one side, including a bottom, at least one side wall and a container opening;—a filter in or above the bottom and/or in the at least one side wall, wherein an area occupied by the filter corresponds to the area of the bottom or the area of the side wall and wherein the filter is substantially impermeable to the powder including the powder bed; and—a connection at the bottom and/or at the side wall of the container or on a side of the filter facing away from the container, wherein the connection is suitable for connection to a suction pump, so that a powder bed disposed in the container is compressed against the filter and stabilized by a low pressure produced by the suction pump.

Advantages of this embodiment are due to consolidation occurring by evacuating the powder bed of the initially at least partly loose dispersed powder. This consolidation consists of densification of the powder bed under the influence of the external atmospheric pressure. This densification causes the position of individual powder grains to become stabilized along with the locally aggregated, melted or otherwise bound regions (domains), depending on the selected manufacturing process, which involve many adjacent powder grains. In this manner, fine structures produced within the powder bed can be reliably obtained and stabilized against mechanical stresses. Mechanical stress on the possibly delicate structures in the powder bed occurs, for example, when a powder bed, which is typically built up layer-by-layer, has a fresh as yet non-processed powder layer added on top of it. When adding to a powder bed already present in a container, for example with a doctor blade, both compressive and shear stresses may arise. Shear stresses of this type can lead to cracks in a structure which might only be partially solidified, or to complete shearing of solidified or partially solidified domains. Similarly, when applying using a doctor blade or hollow doctor blade, the resulting compressive stresses can cause perturbations in the powder bed and in the structure embedded therein. A further advantage of the proposed device lies in the fact that it requires only simple and thus readily replaceable or exchangeable components. As an example, the filter described may consist of a suitably dimensioned layer of felt or a suitably dimensioned frit. A further advantage of the described consolidation of the powder bed arises from the possibility of dispensing with a support structure which has to be produced alongside the target structure (product). Depending on the spatial complexity of the target structure, construction of the necessary suitable support structure alongside it may require a considerable manufacturing outlay. These additional costs can now be dispensed with. Moreover, the material costs per item are reduced, as the powder is now exclusively used for the production of the directly utilized structure (product). Furthermore, the time and cost expenditure per product is reduced, on the one hand because the production of the support structures which were previously required is no longer necessary, and on the other hand by easier unmoulding; in addition, it is no longer necessary to remove the support structures.

In accordance with a further embodiment, a device is proposed wherein the bottom or the filter (3) disposed above the bottom is disposed flush with and at right angles to the side wall or to the filter in the side wall. In this manner, a powder bed disposed above the bottom is delimited on one side by the side face of the side wall. In this manner, the side face of the side wall—depending on its construction—can be formed directly by the side wall itself or by a filter integrated into the side wall.

This embodiment has the advantage that a powder bed formed in the angle between the bottom and side wall is freely accessible from four sides. This means, for example, that a combination of different technologies may be used for consolidating the powder.

In accordance with a further embodiment, a device is proposed wherein the container includes two side walls disposed in a parallel manner to each other and a filter which is flush with each of the side walls and substantially at right angles to mutually opposing areas of the side walls and which can be moved freely between the side walls while retaining its orientation.

Advantages of this embodiment arise, for example, from the simple and robust construction of the device described. As an example, a powder bed may be produced in a recess open on both sides between two opposing walls of the same height, wherein the gap between these walls is filled with powder to the respective upper edges of the two opposing walls. Following an initial local consolidation or structuring of a first layer of the powder bed, another layer is added to the top of the powder bed by lowering the bottom plate between the two opposing walls by one index step. The construction which is open on two sides means that surplus powder can spill out on two sides or pour out to form a pile with an angle of repose which is typical for the material and the consistency. Advantageously, either the bottom plate or at least one side wall is formed as the filter. Thus, at least during lowering of the bottom plate and during application of the new layer, the powder bed can be stabilized by a low pressure applied by the suction pump during these steps or by means of a permanently applied low pressure.

In accordance with a further embodiment, a device is proposed wherein the filter is constructed as a conveyor belt which is disposed to move transversely to the opposing side walls.

The advantages of this embodiment lie in the possibility that an object which is gradually being built up in layers from a powder bed which is built up in layers can be completely removed from the device without having to change the orientation of the doctor blade and/or the tool used to consolidate loose powder (for example: laser, jet, beam source, pressure head, etc.) relative to the position of the two opposing walls. This can be carried out simply by advancing the bottom plate in the direction of one of the two open sides, whereupon the bottom plate moves forward in the manner of a conveyor belt. Moving forwards can occur while maintaining a low pressure applied to the filter if the filter is disposed on the bottom side. The powder bed with the structure contained therein is thus also supported during the advancing step. If at least one of the two side walls disposed at right angles to the bottom is provided with a filter, then prior to moving the bottom plate forwards, the connection of the side filter to the suction pump is interrupted.

In accordance with another embodiment, a device is proposed wherein the filter formed as a conveyor belt is displaceable at right angles to a conveying direction. Preferably, the filter is height-adjustable, wherein a height corresponds to the distance of the filter formed as a conveyor belt to an upper edge of at least one of the two side walls.

For the layer-by-layer construction of the powder bed or the target structure described here, the height of the layer is advantageously set such that optimal conditions are present for the desired consolidation of the powder of the layer under consideration, in that the desired layer thickness is set by lowering the bottom plate downwards. As an example, the layer thickness of the powder bed applied in each case can be varied as a function of the complexity of the structural elements to be produced.

The combination of the features of the above embodiments offers the advantage of continuous manufacture: when a first structure has been produced, the powder bed containing it is removed from the processing region, and then the bottom for building-up the first layer of the new powder bed is prepared. As an example, the filter plate serving as the lower boundary of the container can be lifted and the powder on it can be smoothed with a doctor blade; the low pressure has been or is produced by the suction pump. The next cycle of the additive process is then carried out.

In accordance with a further embodiment, a device is proposed wherein the filter formed as a conveyor belt can be moved step-by-step in a conveying direction.

The advantages of this embodiment are the same as those described in the foregoing. In particular, the direction of movement of the conveyor belt defines a machine direction which provides the advantages of a production line. Furthermore, the length of a shape produced by this form of construction is almost limitless, since there are no principal restrictions to the length of the powder bed in the direction of the conveyor belt (band conveyor).

In accordance with a further embodiment, a device is proposed wherein the filter can be moved in the container relative to a container opening, in particular away from the container opening or towards the container opening.

Advantages of this embodiment arise from the possibility of precisely positioning the bottom plate in order to obtain the desired layer thickness for the powder bed.

In accordance with a further embodiment, a device is proposed wherein the container opening is an upper opening of the container and the filter can be lowered step-by-step in steps of a specific size.

The specific depth of the steps results in a defined layer thickness for the consolidated or part-consolidated structure for an optimized suction power of the pump.

In accordance with a further embodiment, a device is proposed wherein the filter can be dropped in such a manner that a distance from the filter to a plane which is substantially defined by an opening cross-section of the container opening changes uniformly over the whole area occupied by the filter.

Advantages of this embodiment arise from the high reproducibility of the buildup layers obtained and the direct correspondence or portability of the laminar structure targeted by the CAD model design and the actual object produced (prototype).

In accordance with a further embodiment, a device is proposed which further includes a suction pump to evacuate the powder bed.

The above embodiments are based on the possibility of compacting the powder bed under the influence of external (atmospheric) pressure against the bottom and/or a side wall of a container and thus of stabilizing it. This can advantageously be accomplished by maintaining a pressure gradient which degrades in the powder bed. In order to form this pressure gradient, the described device is supplemented by a suitable suction pump. The suitable suction pump produces a sufficiently high volume flow per unit of time and is advantageously suitable, depending on the layer thickness obtained or the height and extent of the powder bed, to maintain a consistently high pressure gradient. In this manner, subsequent sagging of regions of the powder bed which have already been consolidated, and thus the possible risk of damage to the embedded structure, can be avoided.

In accordance with a further embodiment, a device is proposed wherein an arrangement of channels or recesses in the bottom of the container ensures, when the filter has been lowered fully to the bottom of the container, that evacuation of the powder bed through the filter occurs uniformly over the area occupied by the filter.

For configurations of the device with a rigid bottom plate which carries the powder on a mobile filter plate disposed parallel to the bottom plate, there are the advantages of a uniform and widely dispersed pressure gradient even when the filter plate is lowered down fully. The channels and/or recesses described may be star-shaped, net-like or regularly disposed in another manner They allow uniform withdrawal of the fluid conveyed by the suction pump, and thus prevent belated sagging of the powder bed which has already been consolidated.

In a further embodiment, a device is proposed wherein uniform evacuation of the powder bed through the filter is ensured by means of a funnel shape for the filter and/or the bottom.

The advantages of this embodiment lie in additional homogenization of the pressure gradients built up in the powder bed.

In accordance with a further embodiment, a device is proposed wherein the powder bed surrounds at least sections of a component which has been built up at least partially step-by-step or a part of such a component and/or stabilizes and supports a component which has been built up at least partially step-by-step during operation of the suction pump attached via the connection.

The advantages of this embodiment are substantially identical to the advantages described above.

In accordance with a further embodiment, a method for layer-by-layer shaping of a component from a material including a powder provided as a powder bed is proposed, including:—applying at least one layer of the material to a filter;—forming a layer of a layer-by-layer shaped component in the at least one layer of material;—setting up a pressure gradient between the at least one layer of material and the side of the filter facing away from the material by producing a low pressure, wherein the at least one layer which is densified stabilizes and supports the layer of the layer-by-layer shaped component which is formed under the effect of the pressure gradient;—optionally repeating the steps for application, forming and setting up of the pressure gradient until the component has been completely formed in a powder bed, having been built up by the repeated application of layers of material to the filter;—unmoulding of the component. The said steps of the method may be combined together in any order or repeated independently of each other or combined with each other.

Possible advantages of this embodiment arise from dispensing with additional support elements and structures which are without function after removing the consolidated component and which give rise to additional material, time and cost requirements.

In accordance with a further embodiment, the proposed method further includes reinforcing the pressure gradient which is set up by supplying a gas with the aid of an over-pressure produced on that side of the working platform formed as the filter which is facing the powder bed, or in the container containing the powder bed.

Advantages of this embodiment arise from the possibility of being able to further regulate a force which is already exerted by the gas flowing through the packed particles on the powder particle. In particular, this force can be reinforced, since the filter (working platform) is actually permeable to gas, but the powder cannot penetrate into the filter or get through the filter.

In accordance with a modification of this embodiment, the gas which is supplied is selected from an inert gas and/or a reactive gas. This selection depends on the type of powder used and/or the selected binder.

Advantages arise as a function of the type of powder used or the binding of powder particles at spatially resolved locations within a layer. Thus, the presence of an inert gas can help to prevent inadvertent clumping of the particles under the pressure of the packing alone. Similarly, the presence of a reactive gas in the porosity for laser-induced heating, for example, can act to facilitate spatially resolved binding of the laser-exposed particles of a layer. This allows for either improved selectivity and thus a finer structure, or easier removal of the finished shaped body from the powder bed.

A further embodiment proposes collecting the gas supplied to the side of the filter away from the material and optionally compressing it and—in a kind of cycle—feeding it back to the powder bed to the side of the free surface of the powder bed and/or to the side of the filter facing the material.

This has the advantage of saving the quantity of gas required for a complete manufacturing cycle finishing with removal of the prepared component. A unit will, for example, require a continuous supply of gas, but with a specific number of manufacturing cycles, for example, a liquid gas bottle containing the process gas to be supplied will be sufficient.

In accordance with a further embodiment, it is proposed that the pressure of the atmosphere on the side facing the material is more than 0 Pa.

The advantages lie in the overall higher force with which the particles of the intended packing are forced together and thus temporarily fixed in position.

In accordance with a further embodiment, a method is proposed wherein building up the pressure gradient is alternated with applying the material.

Advantages of a discontinuously built-up pressure gradient of this type arise from the possibility of consolidation being uninfluenced by the fluid flows. As an example, a local rise in the temperature used for consolidation can be maintained for longer for the same power and residence time of the appropriate tool, since no premature cooling of the consolidated structure occurs under the influence of fluid which is flowing past.

In accordance with a further embodiment, a method is proposed wherein the pressure gradient is maintained continuously during the application, the forming and the optional repeat steps.

Advantages of this embodiment arise from the use of dry powder masses, since the dry powder mass is held and supported during all of the steps during which damage could occur and the structures which are printed step-by-step are protected.

In accordance with a further embodiment, a method is proposed for additive manufacturing of a component by layer-by-layer consolidation of a powdered material in a powder bed, including at least one temporary build-up of a pressure gradient in the powder bed and concomitant densification of the powder bed and stabilization of the layer-by-layer consolidated material so that the layer-by-layer consolidated material is stabilized and fixed without the use of additional support structures during application of the non-consolidated powdered material.

Advantages of this embodiment arise from dispensing with the support structures which are usually required, as producing them involves additional material, time and cost expenditure.

In accordance with a further embodiment, the use of a device as described above and described in more detail below is proposed for powder-based additive manufacture.

Advantages of the use of the device described arise for the manufacture of prototypes, castings and models in powder beds because of a saving in material, time and costs.

The embodiments described above can be combined in any manner.

Further embodiments, modifications and improvements will become apparent from the following description and the accompanying claims.

In accordance with the invention, the powder bed is stabilized by applying a vacuum to the side of the container which is, as it were, divided by the filter which faces away from the powder bed and/or by applying an over-pressure in the container on the side of the filter which faces the powder bed such that support structures can be dispensed with.

In recent years, many changes have occurred to requirements for the manufacturing industry, in particular in the area of development and prototyping. The increasing number of product variations, with greater complexity, means that the need for prototypes is constantly rising. The main headings of "rapid prototyping", "rapid manufacturing" or "additive manufacturing" covers a multitude of novel technologies with the aid of which the challenge of flexible manufacturing processes can be met.

The significant features of this method are the preparation of process control data from CAD geometrical data with subsequent control of process apparatus. All of these methods have the following features in common.
1. Shaping is not carried out by removing material, but by adding material or by the phase transition of a material from liquid to solid, or compaction of a powdered starting material.
2. All of the methods construct part geometries from layers of a finite thickness which are produced directly from CAD data using a slicing process.

Selective laser sintering (SLS) was originally developed for powders formed from nylon, polycarbonate and waxes and later was extended to metallic powder. Layers of powder are locally sintered on a powder bed in a reactor, wherein the sintering temperature is obtained using lasers.

Selective laser melting (SLM) is a further development of selective laser sintering (SLS) and is used for powder which can be almost completely densified by the formation of a molten phase, wherein the melting temperature is obtained using lasers.

3 D printing uses polymeric, metallic or ceramic powder to apply layers which are then consolidated by local spraying of a binder. Technologies which are similar to an inkjet printer are employed to inject the binder.

Because of the low strength of loose powder, i.e. the powder in the powder bed of a powder-based process for additive manufacturing, as a rule a support structure has to be constructed next to the actual component. The job of the support structure is to fix the component with respect to the building-up platform and thus to fix it in the coordinate system of the apparatus. Forming a support structure is time-consuming In particular, subsequent removal of the support structure from the component proper after completion of the forming process cannot be automated.

In the case of 3 D printing, powder particles flying around from the loose powder bed lead to contamination of the print head and to clogging of the print jets. When using the finest ceramic powder which, for example, is used to increase the sintering activity or to form a particularly fine crystal matrix for ceramic components, these negative features usually increase in importance.

The proposed at least temporary stabilization of a powder bed for additive manufacturing by producing a low pressure and the consolidation of the powder bed thus obtained can overcome the disadvantages which have been described.

By exerting a pressure on the powder bed in as uniform a manner as possible, the individual particles in the powder bed can be fixed and thus the whole structure of the powder bed can be consolidated. Structures which are in the powder bed which have already been produced using the appropriate manufacturing method are stabilized thereby and fixed in the coordinate system of the apparatus. Thus, there is no longer a need for support structures, which means that a great deal of time is saved, since these no longer need to be made and no longer have to be removed from the component once the forming process is complete.

In accordance with the proposed method, the pressure built up for stabilization is generated by the external atmosphere surrounding the powder bed in which a low pressure is generated at the bottom of the powder bed.

The powder bed of an apparatus for additive manufacturing is usually held together by a container which is open at the top. In many units, the height of the bottom of this container is adjustable and in particular, prior to generating a new layer of powder, it is lowered by the thickness of the layer so that a new layer with the necessary volume is available in the container for the addition of a new layer. In accordance with the invention, the bottom is now formed as a filter which is permeable to air, but powder cannot penetrate into the filter or pass through the filter.

In the accompanying FIG. 1, a low pressure can be produced on one side of the filter by, for example, using a suction pump or a vacuum pump which is connected to the container in a manner such that the low pressure which is produced thereby is applied to the porous powder bed via the filter.

The individual particles in the powder bed are fixed by means of the continuous flow of gas produced in the powder bed from the surface of the powder bed to the filter and the pressure gradient which is thus formed.

Advantageously, the pressure difference which is produced is 1 atmosphere.

In accordance with exemplary embodiments of the proposed device and the method based on it, in addition to the low pressure (vacuum) produced on one side on the side of the porous platform away from the powder bed, on the side facing the powder bed, i.e. on the side of the free surface of the powder bed, an over-pressure is produced and in particular used to increase the pressure drop in the powder bed.

One advantage of the device or of the method based on this arises from the fact that now, pressure differences of more than 1 bar can be built up in the powder bed. The forces acting on the particles are correspondingly higher and the support effect is sufficient even for layers of smaller particles which are used to produce much finer structures but have a reduced porosity in the powder bed.

An essential advantage of the proposed method or of the use of the proposed device for carrying it out is the possibility of dispensing with the time-consuming and cost-intensive use of support structures. Both the construction and removal of support structures in powder-based additive manufacturing processes are time-consuming and cost-intensive, as they are not part of the component proper. In particular, removal of the support structure from the component proper is very difficult to automate. Not having to construct support structures is thus of great economic interest.

To our knowledge, until now, a vacuum has never been used to stabilize the powder bed in additive manufacturing processes. Since the stabilization using low pressure can be switched on and off, i.e. it is temporary, the invention can be transferred directly to many powder-based additive manufacturing processes without, for example, affecting the process for unmoulding the component from the powder. This is the basis of the great economic significance of the proposed apparatus and its use.

The accompanying FIGURE illustrates an exemplary embodiment and, together with the description, serves to explain the principles of the proposed method.

In particular, FIG. 1 shows a powder bed (2) which is delimited by closed walls (1) on four sides in the illustrated embodiment. A filter (3) which can be moved with respect to the walls closes off the bottom of the powder bed and allows a vacuum to be applied by sucking off the atmosphere at an appropriate connection (4) or suction piece (4). The powder bed is accessible from the top for the application of further layers of powder of a defined thickness and for local consolidation by the application of a binder, by laser sintering and further consolidation concepts for the respective powder-based additive manufacturing process. Applying a vacuum through a filter results in stabilization of the powder bed.

Completely dispensing with support structures in accordance with the invention has a further decisive advantage. Support structures fix the component on the building-up platform in each stage of its construction. Stresses in the component, which can arise by applying and drying binders in the 3D printing process or by thermal gradients in local laser sintering in each layer, cannot however be compensated for by a small relaxational movement of the appropriate consolidated region of the layer in the context of layer construction. Stresses of this type are thus at least partially associated with the support structure, and after removal of the support structure can sometimes result in irreversible and unpredictable deformation and damage to the component.

In contrast to this, small relaxational movements caused by local stresses in a layer which is free from support structures as defined in the invention can be compensated for during construction of the subsequent layer. The component is thus constructed in a stress-free manner right from the outset. Similarly, when it is removed, no stresses are present in the component which could deform the component or damage it.

Using practical examples, model bodies were manufactured from a ceramic bone replacement material using 3D printing and employing the device described here or the method based on it. Components of this type, which until now could only be obtained with the support of a support structure, are now generated freely in the powder bed without a support structure.

The method described is fundamentally suitable for all three classes of substance, for polymeric, ceramic and metallic substances. A further advantage of the method is the fact that, in order to apply layers, the powder always has to have good flow properties. This means that the particle size for the powder cannot fall short of a certain minimum value. With powders with particles which are too fine, the adhesive forces between the particles are comparable with the gravitational forces which act on the particle which counteract uniform flowing and thus uniform build-up of the layers. The use of fine powders, however, has many advantages, for example the possibility of building up thinner layers, which means that the building precision is higher, or subsequent densification of the components by sintering is better, since smaller particles are easier to sinter. The gas flow (or air flow) caused by the low pressure (pressure difference) in the porous powder bed now allows finer powders to be used since, in addition to the force of gravity, each individual particle experiences an additional force due to the flow of air in the direction of the surface of the powder bed. Advantageously, this facilitates the uniform build-up of layers, even with powder which is not flow-optimized.

Although specific embodiments have been illustrated and described herein, the scope of the present invention encompasses appropriate modifications to the embodiments shown without departing from the scope of the present invention. The claims below constitute a first, non-binding approach to defining the invention in general.

REFERENCES

[1] Jensen, K: State-of-the-Art of Different Available and Coming Rp-Systems. Proceedings of the "$2^{nd}$ Scandinavian Rapid Prototyping Conference, Exhibition and Course", Aarhus, 1993.
[2] Sheng, X, Tucholke, U: On Triangulating Surface Models for SLA. Proceedings of the $2^{nd}$ International Conference on Rapid Prototyping, Dayton, Ohio, 23-26.6.1991.
[3] Lakshminarayan, U, Zong G, Richards W, Marcus, H: Solid Free Form Fabrication of Ceramics. Proceedings of the Symposium on Synthesis and Processing of Ceramics, Fall Meeting of the Material Research Society, Boston, Mass, Dec. 2-6, 1991.
[4] Reinhold Melcher, Dissertation, Erlangen 2009

LIST OF REFERENCE NUMERALS

1 container;
2 powder, powder bed;
3 filter, sieve structure;
4 connection for a suction pump; suction connection;
10 device for stabilizing a powder bed for additive manufacturing

What is claimed is:
1. A device for stabilizing a powder bed employing low pressure for an additive manufacturing method, comprising:
   a container open on at least one side, comprising a bottom, at least one side wall and a container opening;
   a filter in or above the bottom and/or in the at least one side wall, wherein an area occupied by the filter corresponds to the area of the bottom or the area of the side wall and wherein the filter is substantially impermeable to the powder comprising the powder bed;
   a connection at the bottom and/or at the side wall of the container or on a side of the filter facing away from the container, wherein the connection is suitable for connection to a suction pump,
so that a powder bed disposed in the container is compressed against the filter and stabilized by a low pressure produced by the suction pump; and
   a compression device which can be connected to or attached to the container opening, which can be used to exert pressure on the powder bed via a pressurized gas.
2. The device as claimed in claim 1, wherein the bottom or the filter disposed above the bottom is disposed flush with and at right angles to the side wall or to the filter in the side wall.
3. The device as claimed in claim 1, wherein the container comprises two side walls disposed in a parallel manner to each other and at least one filter which is flush with each of the side walls and substantially at right angles to mutually opposing areas of the side walls and which can be moved freely between the side walls while retaining its orientation.
4. The device as claimed in claim 1, wherein the compression device is selected from a pump, a compressor and/or a compressed gas cylinder.
5. The device as claimed in claim 1, wherein the filter is constructed as a conveyor belt which is disposed to move transversely to the opposing side walls.
6. The device as claimed in claim 5, wherein the filter formed as a conveyor belt is displaceable at right angles to a conveying direction.
7. The device as claimed in claim 5, wherein the filter formed as a conveyor belt can be moved step-by-step in a conveying direction.

8. The device as claimed in claim 1, wherein the filter can be moved in the container relative to a container opening, away from the container opening or towards the container opening.

9. The device as claimed in claim 1, wherein the container opening is an upper opening of the container and the filter can be lowered in steps of a specific size.

10. The device as claimed in claim 9, wherein the filter can be lowered in such a manner that a distance from the filter to a plane which is substantially defined by an opening cross-section of the container opening changes uniformly over the whole area occupied by the filter.

11. The device as claimed in claim 1, further comprising a suction pump to evacuate the powder bed.

12. The device as claimed in claim 1, wherein an arrangement of channels or recesses in the bottom of the container ensures that, when the filter has been lowered fully to the bottom of the container, evacuation of the powder bed through the filter occurs uniformly over the area occupied by the filter.

13. The device as claimed in claim 1, wherein uniform evacuation of the powder bed through the filter is ensured by means of a funnel shape for the filter and/or the bottom.

14. The device as claimed in claim 1, wherein the powder bed surrounds at least a section of a component which has been built up at least partially step-by-step or a part of such a component and/or stabilizes and supports a component which has been built up at least partially step-by-step during operation of the suction pump attached via the connection.

15. A method for layer-by-layer shaping of a component from a material comprising a powder provided as a powder bed, comprising:
    applying at least one layer of the material to a filter;
    forming a layer of a layer-by-layer shaped component in the at least one layer of material;
    setting up a pressure gradient between the at least one layer of material and the side of the filter facing away from the material by producing a low pressure, wherein the at least one layer which is densified stabilizes and supports the layer of the layer-by-layer shaped component which is formed under the effect of the pressure gradient;
    reinforcing the pressure gradient formed by producing an over-pressure on one side of the free surface of the powder bed and/or on a side of the filter facing the material, by supplying a gas;
    optionally repeating the steps for application, forming and setting up of the pressure gradient until the component has been completely formed in a powder bed, having been built up by the repeated application of layers of material to the filter; and
    unmoulding of the component.

16. The method as claimed in claim 15, wherein the gas which is supplied is selected from an inert gas and/or a reactive gas.

17. The method as claimed in claim 15, further comprising:
    collecting and/or compressing the supplied gas on the side of the filter facing away from the material, and
    freshly supplying the collected and/or compressed gas to the side of the free surface of the powder bed and/or to the side of the filter facing the material.

18. The method as claimed in claim 15, wherein the pressure of the atmosphere on the side facing the material is more than 0 Pa.

19. The method as claimed in claim 15, wherein building up the pressure gradient is alternated with applying the material.

20. The method as claimed in claim 15, wherein the pressure gradient is maintained continuously during the application, the forming and the optional repeat steps.

21. A device for stabilizing a powder bed employing low pressure for an additive manufacturing method, comprising:
    a container open on at least one side, comprising a bottom, at least one side wall and a container opening;
    a filter in or above the bottom and/or in the at least one side wall, wherein an area occupied by the filter corresponds to the area of the bottom or the area of the side wall and wherein the filter is substantially impermeable to the powder comprising the powder bed; wherein the filter is constructed as a conveyor belt which is disposed to move transversely to the opposing side walls; and
    a connection at the bottom and/or at the side wall of the container or on a side of the filter facing away from the container, wherein the connection is suitable for connection to a suction pump,
so that a powder bed disposed in the container is compressed against the filter and stabilized by a low pressure produced by the suction pump.

22. A device for stabilizing a powder bed employing low pressure for an additive manufacturing method, comprising:
    a container open on at least one side, comprising a bottom, at least one side wall and a container opening;
    a filter in or above the bottom and/or in the at least one side wall, wherein an area occupied by the filter corresponds to the area of the bottom or the area of the side wall and wherein the filter is substantially impermeable to the powder comprising the powder bed; and
    a connection at the bottom and/or at the side wall of the container or on a side of the filter facing away from the container, wherein the connection is suitable for connection to a suction pump,
so that a powder bed disposed in the container is compressed against the filter and stabilized by a low pressure produced by the suction pump; wherein uniform evacuation of the powder bed through the filter is ensured by means of a funnel shape for the filter and/or the bottom.

* * * * *